United States Patent
Egolf (10) Patent No.: US 7,614,615 B2
(45) Date of Patent: Nov. 10, 2009

(54) DIRECTIONAL STABILIZER RING AND FLUID SPRING ASSEMBLY INCLUDING SAME

(75) Inventor: Stephen R. Egolf, Indianapolis, IN (US)

(73) Assignee: BFS Diversified Products, LLC

(*) Notice: Subject to any disclaimer, the term of this patent is extended or adjusted under 35 U.S.C. 154(b) by 250 days.

(21) Appl. No.: 11/654,745

(22) Filed: Jan. 18, 2007

(65) Prior Publication Data

US 2008/0174056 A1     Jul. 24, 2008

(51) Int. Cl.
    *F16F 9/04*      (2006.01)
(52) U.S. Cl. .................... 267/64.19; 267/64.27
(58) Field of Classification Search .............. 267/64.19, 267/64.27, 64.24, 64.28, 64.23
See application file for complete search history.

(56) References Cited

U.S. PATENT DOCUMENTS

| | | | |
|---|---|---|---|
| 4,787,608 A * | 11/1988 | Elliott | .............. 267/64.27 |
| 5,129,634 A | 7/1992 | Harris | |
| 5,752,692 A * | 5/1998 | Crabtree et al. | .......... 267/64.24 |
| 6,345,813 B1 | 2/2002 | Trowbridge | |
| 6,382,602 B1 | 5/2002 | Morrow | |
| 6,585,239 B2 * | 7/2003 | Eichhorn et al. | ......... 267/64.24 |
| 6,746,004 B2 | 6/2004 | Leonard et al. | |
| 6,902,155 B1 * | 6/2005 | Crabtree | ................. 267/64.24 |
| 2003/0116898 A1 | 6/2003 | Leonard et al. | |
| 2005/0173851 A1 | 8/2005 | Lloyd | |

FOREIGN PATENT DOCUMENTS

DE      103 00 806 A1      8/2003

* cited by examiner

*Primary Examiner*—Melanie Torres
(74) *Attorney, Agent, or Firm*—Sarah M Jabbari; Matthew Dugan (57) ABSTRACT

A directional stabilizer ring includes a first or mounting surface and a second or biasing surface that faces away from the first surface and extends at an included angle relative thereto. The second surface is configured to abuttingly engage the flexible wall of a fluid spring assembly and to bias at least a portion thereof in a preferred direction. A fluid spring assembly and a suspension system that utilize such a directional stabilizer ring as well as a method of biasing a flexible wall using such a directional stabilizer ring are also included.

18 Claims, 5 Drawing Sheets

DIRECTIONAL STABILIZER RING AND FLUID SPRING ASSEMBLY INCLUDING SAME

BACKGROUND

The present novel concept broadly relates to fluid spring suspension systems and, more particularly, to a directional stabilizer ring capable of biasing the flexible wall of a fluid spring assembly in a preferred direction.

The subject matter of the present disclosure finds particular application and use in conjunction with suspension systems of wheeled vehicles, and will be shown and described herein with reference thereto. However, it is to be appreciated that the subject matter of the present disclosure is also amenable to other applications and environments, and that the specific uses shown and described herein are merely exemplary. For example, the subject matter of the present disclosure could be used in support structures, height adjusting systems and actuators associated with industrial machinery, components thereof and/or other such equipment. Accordingly, the subject matter of the present disclosure is not intended to be limited to use associated with vehicle suspensions.

Convoluted bellows-type fluid springs are well known and commonly used in a wide variety of applications. One example of such an application is where the structural components between which the fluid spring is supported are disposed and generally displaced in approximately parallel relation to one another. During use in such environments, however, convoluted bellows-type fluid springs can, under some conditions, laterally deflect or otherwise become unstable. In particular, this tendency is more prevalent in convoluted fluid springs having a relatively high ratio of height to diameter.

In addition to reducing one or more performance characteristics of the fluid spring, such lateral deflection and/or instability can be particularly problematic where, for example, structural members or other components are disposed adjacent the fluid spring. In such situations, the flexible wall of the fluid spring may come into contact with the adjacent structure or component and thereby damage the same. Additionally, undesirable wear and/or abrasion can occur on or along the flexible wall of the fluid spring assembly.

One solution to the foregoing issue is to install a stabilizer ring, which is also commonly referred to as a support ring, around each end member of the fluid spring, as is illustrated in U.S. Pat. Nos. 6,746,004 and 6,345,813, for example. Such rings provide an expanded base or foundation for the flexible wall of the fluid spring to bear against during compressive displacement actions. This helps to stabilize the fluid spring and can, in some applications, reduce or eliminate buckling and other lateral deflection issues.

Importantly, such known stabilizer or support rings generally include a uniform cross section that extends about the full circumference of the end member of the fluid spring. As such, these known devices are generally well suited for maintaining the fluid spring in a central or neutral position. One disadvantage of such known constructions, however, is that this fully circumferential and uniform annular cross section results in a configuration that is not suitable for biasing or otherwise deflecting the flexible wall of the fluid spring in a specific direction, such as, for example, where it is desirable to bias a flexible wall away from an existing structure to establish additional operating clearance therebetween.

Another difficulty with the use of known stabilizer rings is that the same are generally ineffective when the structural components between which the fluid spring is supported are disposed at an angle relative to one another. In such applications, the end members of the air spring are also disposed at an angle to one another. As a result, the flexible wall of the fluid spring is "pinched" in a manner that results in the flexible wall being laterally displaced toward the open end of the angle formed between the end members of the fluid spring. This condition increases in severity as the structural components toward one another and the fluid spring assembly is thereby increasingly compressed. In such applications, however, the use of conventional stabilizer rings will not operate to displace the fluid spring away from the open end and back toward a more central position.

Accordingly, it is believed desirable to develop a directional stabilizer ring and fluid spring assembly utilizing the same that overcomes the foregoing and other problems and disadvantages.

BRIEF DESCRIPTION

One exemplary embodiment of a fluid spring assembly in accordance with the present novel concept is provided that includes a first end member and a second end member that is spaced from the first end member. A flexible wall that includes opposing open ends is secured between the first and second end members and at least partially defines a spring chamber therebetween with a central axis that extends between the opposing open ends. The flexible wall includes at least one convoluted wall portion that is disposed between the opposing open ends. A first directional stabilizer ring is supported circumferentially around at least a portion of the first end member for biasing at least a first portion of the flexible wall in a predetermined direction that is approximately transverse to the central axis. The first ring includes a first wall disposed axially outwardly from the flexible wall. A second wall is disposed toward the flexible wall and extends at an included angle of from about 3 degrees to about 85 degrees relative to the first wall. The second wall is capable of biasing at least the first portion of the flexible wall in a predetermined direction that is approximately transverse to the central axis.

One exemplary embodiment of a suspension system in accordance with the present novel concept for supporting an associated sprung mass on an associated unsprung mass of an associated vehicle is provided. The suspension system includes a fluid spring assembly that is disposed between the associated sprung and unsprung masses. The fluid spring assembly includes a first end member that is capable of securement on the associated sprung mass. A second end member is spaced from the first end member and is capable of securement on the associated unsprung mass. A flexible wall is secured between the first and second end members and at least partially defines a spring chamber having an axis extending therebetween. The flexible wall includes a girdle hoop, a first convoluted wall portion that extends between the girdle hoop and the first end member, and a second convoluted wall portion that extends between the girdle hoop and the second end member. The suspension system also includes a first directional stabilizer ring that is supported adjacent the first end member of the fluid spring assembly. The first ring is capable of biasing at least a portion of the flexible wall of the fluid spring assembly in a direction approximately transverse to the axis. The first ring includes a first surface facing generally away from the flexible wall and a second surface facing generally toward the flexible wall. The second surface is disposed at an included angle of from about 3 degrees to about 85 degrees relative to the first surface such that upon engaging the second surface at least the first portion of the flexible wall is biased in the direction approximately transverse to the axis.

The suspension system also includes a pressurized fluid source in communication with the fluid spring assembly and a control device operatively connected between the pressurized fluid source and the fluid spring assembly. The control device is adapted to selectively permit pressurized fluid flow to and from the fluid spring assembly. An electronic control unit is connected to the control device and is capable of actuating the same to selectively permit pressurized fluid flow to and from the fluid spring assembly.

One exemplary embodiment of a directional stabilizer ring in accordance with the present novel concept for use with an associated fluid spring assembly having an associated end member and an associated flexible wall that includes at least one convoluted wall portion is provided. The directional stabilizer ring includes a ring body extending circumferentially about a central axis. A mounting surface is formed along the ring body and is suitable for disposition in a direction generally away from the associated flexible wall. A biasing surface is also formed along the ring body. The biasing surface faces away from the mounting surface and extends at an included angle of from about 3 degrees to about 85 degrees relative thereto. The biasing surface is configured to abuttingly engage the associated flexible wall and to bias at least a portion thereof in a direction approximately transverse to the central axis. An inner surface is formed along the ring body that is capable of cooperating with the associated end member and extends generally axially between the mounting and biasing surfaces. An outer surface is formed along the ring body. The outer surface is disposed radially outwardly from the inner surface such that the mounting and biasing surfaces extend therebetween.

One exemplary method in accordance with the present novel concept of biasing a flexible wall of a fluid spring assembly in a preferred direction is provided that includes providing a fluid spring assembly and a first directional stabilizer ring. The fluid spring assembly includes a first and end member, a second end member that is spaced from the first end member and a flexible wall that is secured between the first and second end members and at least partially forms a spring chamber therebetween that has a central axis. The flexible wall includes at least one convoluted wall portion disposed between the first and second end members. The first directional stabilizer ring includes a first surface, a second surface facing away from the first surface and disposed at an included angle of from about 3 degrees to about 85 degrees relative thereto, and an inner surface that is complementary to the first end member of the fluid spring assembly. The method also includes positioning the first ring about the first end member of the fluid spring assembly such that the first surface is facing away from the flexible wall, such that the inner wall is disposed adjacent an outer peripheral portion of the first end member, and such that the second surface is facing toward the flexible wall and capable of abuttingly engaging the flexible wall to bias at least a portion thereof toward the preferred direction. The method further includes securing the first ring about the first end member such that upon relative displacement of the first and second end members toward one another, the first ring engages and biases at least a portion of the flexible wall in approximately the preferred direction.

DETAILED DESCRIPTION

Figure 1:
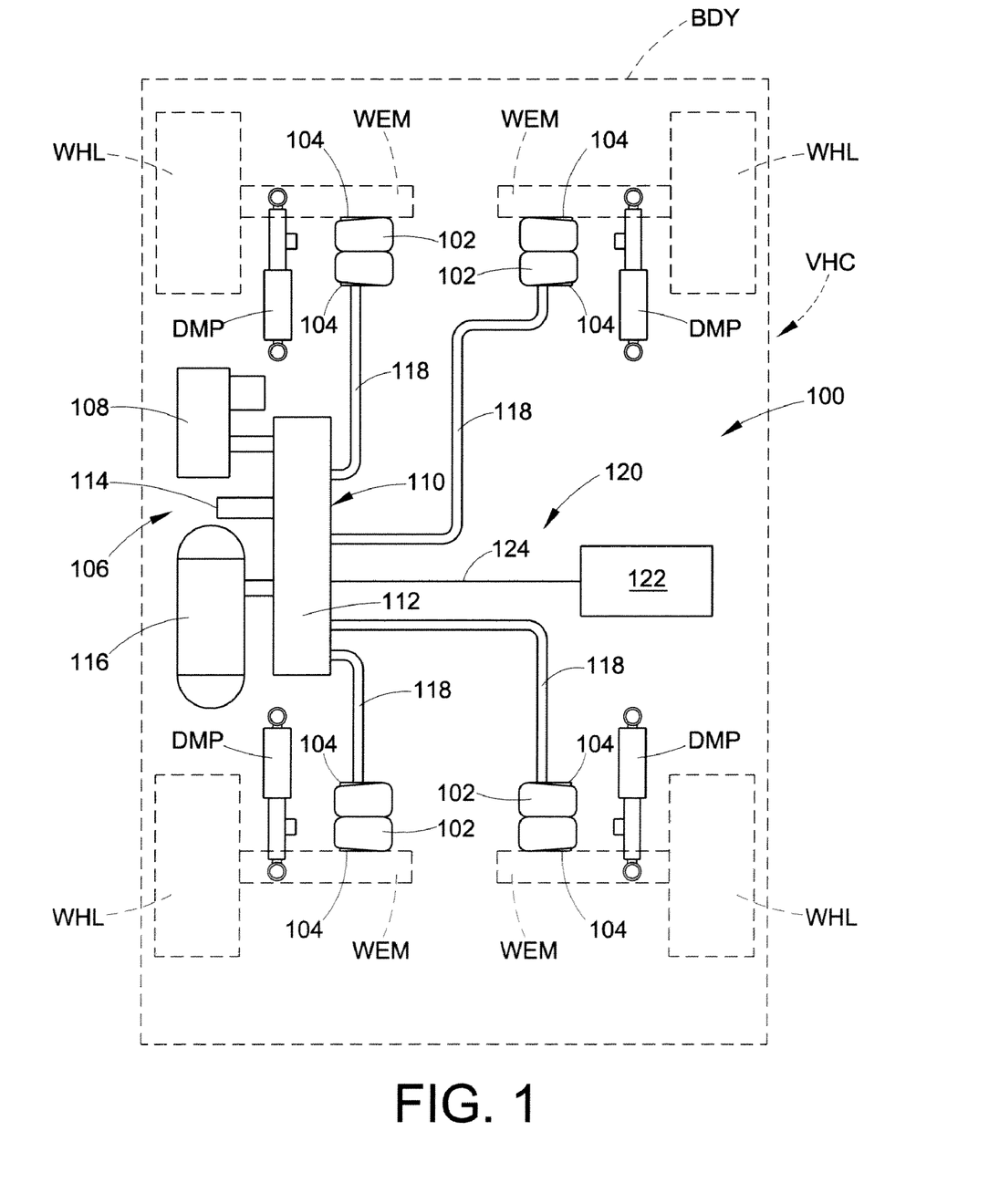
FIG. 1 is a schematic representation of one exemplary embodiment of a vehicle suspension system utilizing fluid spring assemblies and directional stability rings in accordance with the present novel concept.

Turning now to the drawings, wherein the showings are for the purpose of illustrating exemplary embodiments of the present novel concept and not for the purpose of limiting the same, FIG. 1 illustrates one embodiment of a suspension system 100 disposed between a sprung mass, such as an associated vehicle body BDY, for example, and an unsprung mass, such as an associated wheel WHL or an associated wheel engaging member WEM, for example, of an associated vehicle VHC. It will be appreciated that any such suspension system can include any number of one or more systems, components and/or devices and that the same can be operatively connected between the sprung and unsprung masses of the associated vehicle in any suitable manner. For example, such a suspension system can include a plurality of damping members, such as dampers DMP, for example, that can be operatively connected between the sprung and unsprung masses of the associated vehicle in any suitable manner.

Such a suspension system also includes a plurality of fluid spring assemblies that are supported between the sprung and unsprung masses of the associated vehicle. In the embodiment shown in FIG. 1, suspension system 100 includes four fluid spring assemblies 102, one of which is disposed toward each corner of the associated vehicle adjacent a corresponding wheel WHL. However, it will be appreciated that any other suitable number of fluid spring assemblies could alternately be used in any other suitable configuration or arrangement. As shown in FIG. 1, fluid spring assemblies 102 are supported between wheel engaging members WEM and body BDY of associated vehicle VHC. As will be discussed in greater detail hereinafter, suspension system 100 also includes directional stabilizer rings 104 disposed in operative association with fluid spring assemblies 102. Additionally, it will be recognized that the fluid spring assemblies shown and described herein (e.g., fluid spring assemblies 102) are of a convoluted-bellows type construction. It should be understood that although fluid spring assemblies having two convolutions are shown and described herein, fluid spring assemblies having convoluted bellows-type flexible walls with any other number (i.e., one or more), arrangement and/or construction of convolutions could alternately be used.

Suspension system 100 also includes a pressurized fluid supply system 106 that is operatively associated with the fluid spring assemblies for selectively supplying pressurized fluid (e.g., air) thereto and selectively transferring pressurized fluid therefrom. In the exemplary embodiment shown in FIG. 1, fluid supply system 106 includes a pressurized fluid source, such as a compressor 108, for example, for generating pressurized fluid, such as compressed air, for example. The fluid supply system can also include any number of one or more control devices of any suitable type, kind and/or construction as may be capable of affecting the selective transfer of pressurized fluid. For example, a valve assembly 110 is shown as being in communication with compressor 108 and can be of any suitable configuration or arrangement. In the exemplary embodiment shown, valve assembly 110 includes a valve block 112 with a plurality of valves (not shown) supported thereon. Valve assembly 110 can also optionally include a suitable exhaust, such as a muffler 114, for example, for venting pressurized fluid from the system. Optionally, pressurized fluid supply system 106 can also include a reservoir 116 in fluid communication with valve assembly 110 and suitable for storing pressurized fluid.

The one or more control devices, such as valve assembly 110, for example, can be in communication with fluid spring assemblies 102 in any suitable manner, such as, for example, through suitable transmission lines 118. As such, pressurized fluid can be selectively transmitted to and/or from the fluid springs through valve assembly 110, such as to alter or maintain vehicle height at one or more corners of the vehicle, for example.

Suspension system 100 also includes a control system 120 that is capable of communication with any one or more other systems and/or components (not shown) of suspension system 100 and/or of which VHC for selective operation and control of the suspension system. Control system 120 includes a controller or electronic control unit (ECU) 122 in communication with compressor 108 and/or valve assembly 110, such as through a conductor or lead 124, for example, for selective operation and control thereof, including supplying and exhausting pressurized fluid to and from fluid spring assemblies 102. Controller 122 can be of any suitable type, kind and/or configuration.

Control system 120 can also optionally include one or more height or distance sensing devices (not shown) as well as any other desired systems and/or components. Such height sensors, if provided, are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may operate using ultrasonic or electromagnetic waves, for example.

Figure 2:
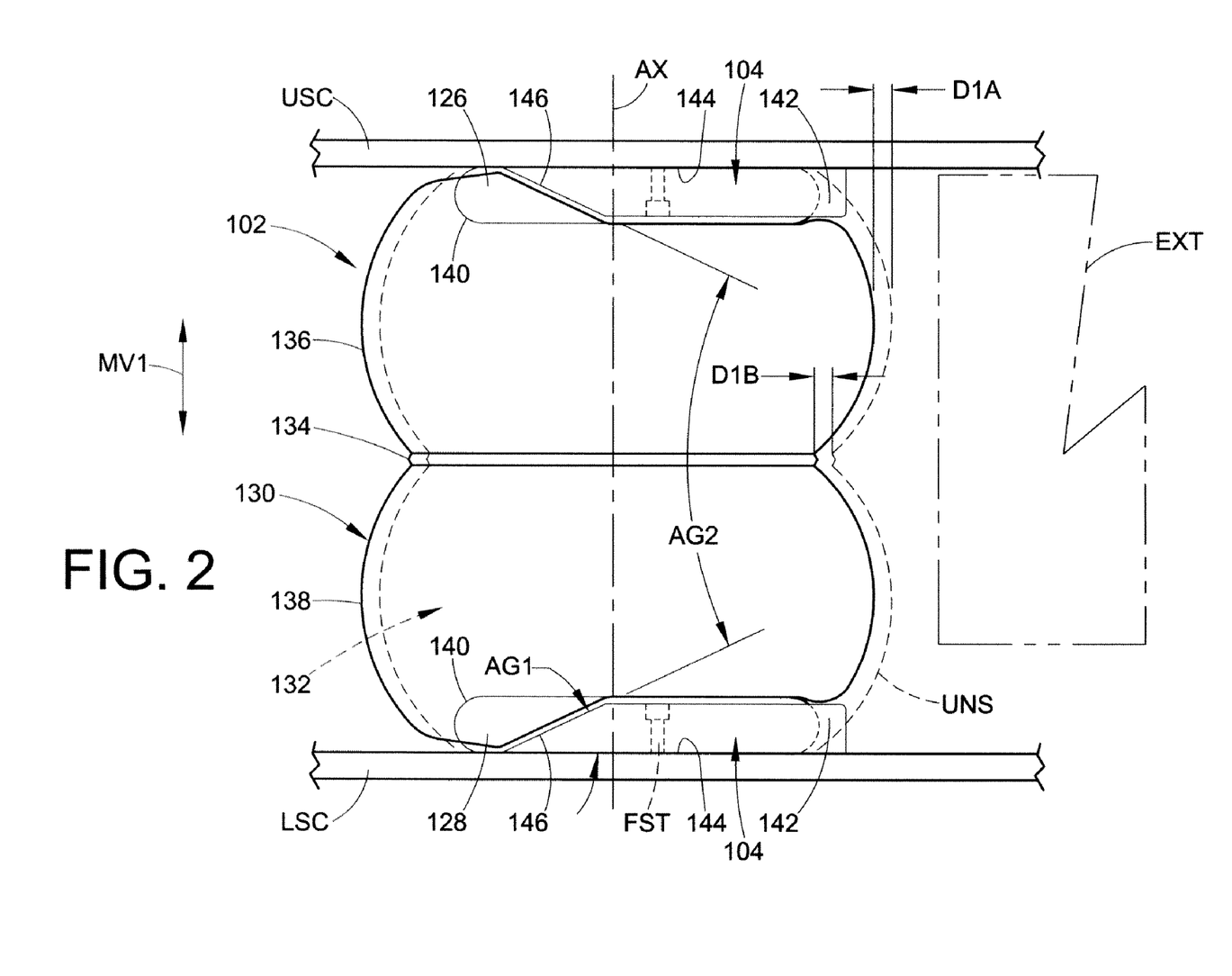
FIG. 2 is a side view of one exemplary embodiment of a fluid spring assembly in use with directional stability rings in accordance with the present novel concept shown supported between structural components that are disposed in approximately parallel alignment with one another.

Turning now to FIG. 2, air spring assembly 102 is shown supported between an upper structural component USC and an opposing lower structural component LSC, which components are merely representative of structural components of any suitable type, kind and/or configuration, such as body BDY and wheel-engaging member WEM of vehicle VHC, for example. In the arrangement shown in FIG. 2, the upper and lower structural components are shown as being disposed in approximately parallel relation to one another and are generally displaced relative to one another such that this approximately parallel or aligned condition is maintained, as indicated by arrow MV1. Disposed adjacent fluid spring assembly 102 and shown supported on upper structural component USC is a representation of an external system, component or structure, as indicated by reference characters EXT.

Fluid spring assembly 102 includes a first end member, such as a first bead plate 126, for example, a second end member, such as a second bead plate 128, for example, that is spaced from the first end member. A flexible wall 130 is secured between the first and second end members and at least partially forms a spring chamber 132 therebetween. Fluid spring assembly 102 also includes a central axis AX extending longitudinally between the first and second end members.

Fluid spring assembly 102 is preferably of a convoluted or bellows-type construction. As such, the flexible wall of the fluid spring assembly will have at least one convoluted wall portion disposed between the opposing end members. In the exemplary embodiment shown in FIG. 2, flexible wall 130 includes a girdle hoop 134 disposed approximately midway along the flexible wall. A first convoluted wall portion 136 extends between the girdle hoop and the first end member. Additionally, a second convoluted wall portion 138 extends between the girdle hoop and the second end member. It will be appreciated that fluid spring assembly 102 can be of any type or kind of convoluted spring construction and/or configuration. In the exemplary embodiment shown, bead plates 126 and 128 are secured on the opposing open ends (not shown) of flexible wall 130 to form a substantially fluid-tight connection therewith, such as by roll-crimping or otherwise deforming an outer peripheral wall portion of the bead plates about a portion of the end of the flexible wall, as is indicated by curved outer wall portions 140.

Under typical usage conditions in which a known fluid spring assembly is secured but otherwise unsupported between the spaced structural components, the flexible wall of such a known fluid spring assembly will typically take on an outer shape or profile such as that which is represented by dashed outline UNS. As shown in FIG. 2, however, directional stabilizer rings 104 can be installed along the opposing end members of the fluid spring assembly, which directional stabilizer rings are operative to engage the flexible wall of the fluid spring assembly and bias at least a portion of the flexible wall in an approximately lateral direction. Thus, flexible wall 130 is shown as being biased in a preferred direction away from external structure EXT. More specifically, any one or more portions of the flexible wall can be biased or otherwise deflected due to the influence of the directional stabilizer rings, such as, for example, the displacement or shifting of first convoluted wall portion 136, as indicated by dimension D1A, and the displacement or shifting of girdle hoop 134, as indicated by dimension D1B.

Figure 3:
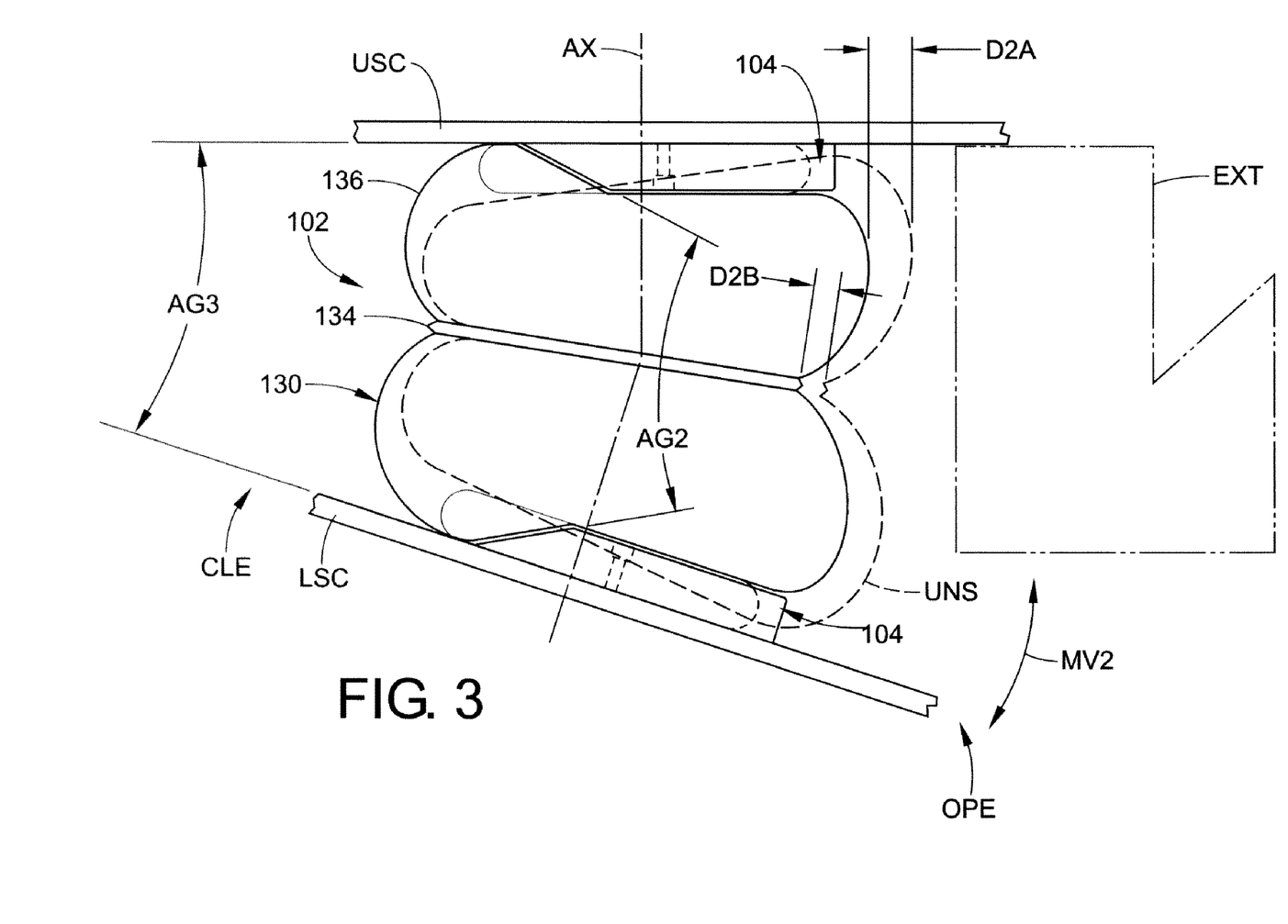
FIG. 3 is a side view of the fluid spring assembly and directional stability rings in FIG. 2 shown supported between structural components that are disposed at an angle relative to one another.

In the exemplary embodiment shown in FIGS. 2 and 3, directional stabilizer rings 104 are disposed generally coaxially about the end members of the fluid spring assembly. The dimensional stabilizer rings are shown as including a ring body 142 with a first or mounting wall or surface 144 formed therealong. The mounting surface is disposed axially outwardly from the flexible wall of the fluid spring assembly and faces toward the adjacent structural component. The ring body is also shown as including a second or biasing wall or surface 146 that faces generally away from mounting surface 144 and is disposed relative thereto at an included angle AG1. With the mounting surfaces thereof disposed outwardly toward the associated structural components, the directional stabilizer rings are preferably disposed in approximate rotational alignment with one another about axis AX such that biasing surfaces 146 are approximately aligned and extend at an angle AG2 relative to one another. Additionally, it will be appreciated that the directional stability rings can be secured on or about the end members of the fluid spring assembly in any suitable manner, such as by mounting the directional stability rings on the associated structural components using suitable fasteners FST, for example.

Turning now to FIG. 3, fluid spring assembly 102 and directional stabilizer rings 104 are shown in use between upper and lower structural components USC and LSC, which in this embodiment are disposed at an included angle AG3 relative to one another such that a first or closed end CLE and a second or open end OPE of the structural arrangement is formed. It will be appreciated that the configuration and arrangement of fluid spring assembly and directional stabilizer rings in the embodiment shown in FIG. 3 is otherwise substantially identical to that shown in and described with regard to FIG. 2. As is also discussed above, disposed adjacent fluid spring assembly 102 and shown supported on upper structural component USC is a representation of an external system, component or structure, as is indicated by reference characters EXT.

During use, the upper and lower structural components can be angularly displaced relative to one another, as is indicated by arrow MV2. Responsive to movement of the structural components toward one another and in which direction the fluid spring assembly will be generally compressed, the flexible wall of a conventional fluid spring assembly, which is secured but otherwise unsupported between the structural members, will be pinched or squeezed in a generally lateral direction from closed end CLE toward open end OPE of angle AG3, as indicated by the outer shape or profile represented by dashed outline UNS. By utilizing directional stabilizer rings 104, however, one or more portions of flexible wall 130 can be biased or otherwise displaced in a direction approximately transverse to axis AX. As such, additional clearance can be generated between the fluid spring assembly and external structure EXT, such as is shown by the displacement or shifting of first convoluted wall portion 136 and girdle hoop 134, as represented by dimensions D2A and D2B, respectively.

Figure 4:
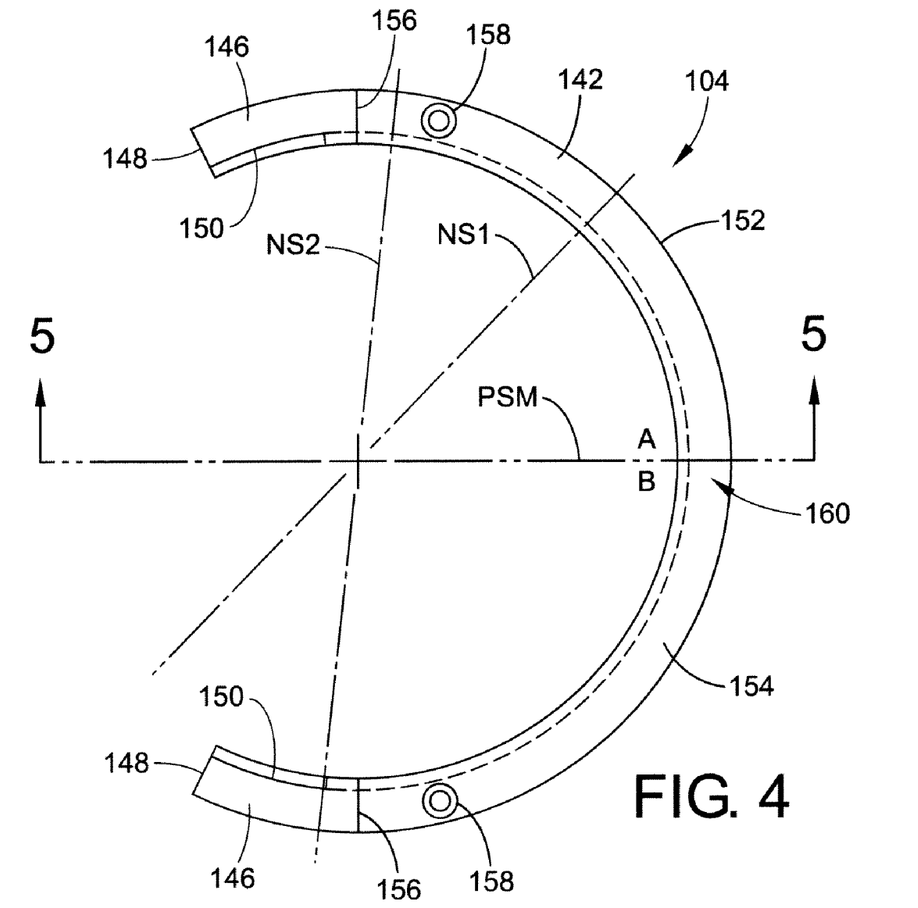
FIG. 4 is a top view of one exemplary embodiment of a directional stabilizer ring in accordance with the present novel concept.
Figure 5:
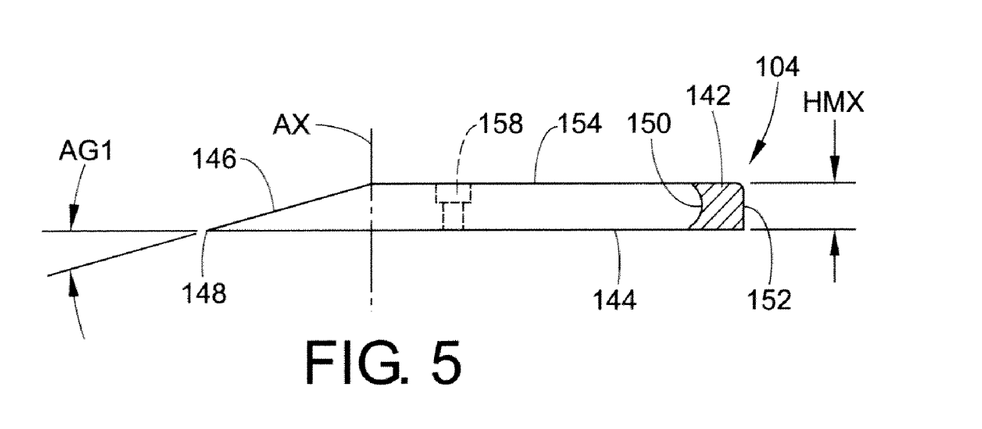
FIG. 5 is a cross-sectional side view of the directional stability ring in FIG. 4 taken along line 5-5 thereof.

FIGS. 4 and 5 illustrate one exemplary embodiment of directional stabilizer ring 104 in accordance with the present novel concept. The directional stabilizer ring includes a ring body, which is generally indicated by reference number 142, that can be formed from any suitable material or combination of materials capable of withstanding the environmental and load conditions of a given application or use. As discussed above, ring body 142 includes a first or mounting wall or surface 144, which is suitable for cooperatively engaging an associated mounting structure, such as one of upper and lower structural components USC, LSC as shown in FIGS. 2 and 3, for example. Ring body 142 also includes at least one second or biasing wall or surface 146 facing generally away from mounting surface 144 and extending at an included angle AG1 relative thereto, as has been discussed above. Though it will be appreciated that any suitable angle or range of angles can be used, one exemplary range for angle AG1 is from about 3 degrees to about 85 degrees. As shown in the exemplary embodiment in FIG. 5, angle AG1 is approximately 20 degrees.

Ring body 142 extends between circumferentially spaced ring ends 148 and also includes an inner wall or surface 150 and an outer wall or surface 152 that is spaced radially outwardly from the inner surface. In one preferred arrangement, inner surface 150 is complementary to an outer peripheral or curved wall portion of a corresponding end member, such as one or wall portions 140, for example. One benefit of such an arrangement is that the directional stabilizer rings can be positioned in close proximity, if not in abutting engagement, with the end member to minimize any gap or space formed therebetween. Additionally, ring body 142 can also optionally include an end wall or surface 154 disposed generally opposite first or mounting surface 144. In such an embodiment, biasing surface 148 may extend to and/or at least partially form an edge 156 with the end wall. Furthermore, ring body 142 can optionally include mounting holes 158 for receiving suitable fasteners to thereby secure the directional stabilizer ring on or to an associated structural component. It will be appreciated that the ring body can alternately be secured in any other suitable manner.

Ring body 142 is shown as having a maximum height along an approximately central portion 160, which maximum height is indicated by dimension HMX. Additionally, first or mounting surface 144 and second or biasing surface 146 are shown in the exemplary embodiment in FIGS. 4 and 5 as intersecting along ring ends 148. As such, ring body 142 has an approximately zero height at the ring ends. Furthermore, directional stabilizer ring 104 has a plane of symmetry PSM extending centrally therethrough. As such, it will be appreciated that at least the functional surfaces or walls (e.g., biasing surface 146) of the directional stabilizer ring have an approximately symmetrical or mirror-like configuration on each of sides A and B of plane PSM. The directional stabilizer ring also has at least one plane of non-symmetry extending centrally therethrough and on opposite sides of which at least the functional surfaces (e.g., biasing surface 146) of the directional stabilizer ring have significantly different configurations. In the embodiment shown in FIGS. 4 and 5, exemplary planes of non-symmetry are shown as planes NS1 and NS2.

Figure 6:
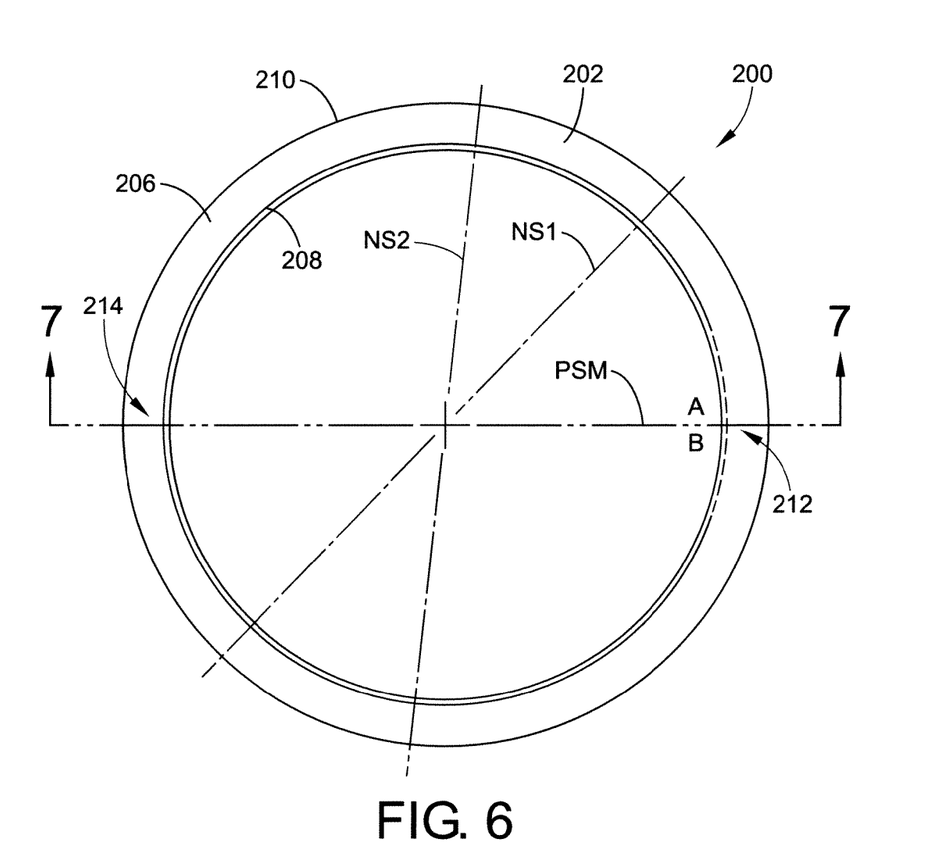
FIG. 6 is a top view of another exemplary embodiment of a directional stability ring in accordance with the present novel concept.
Figure 7:
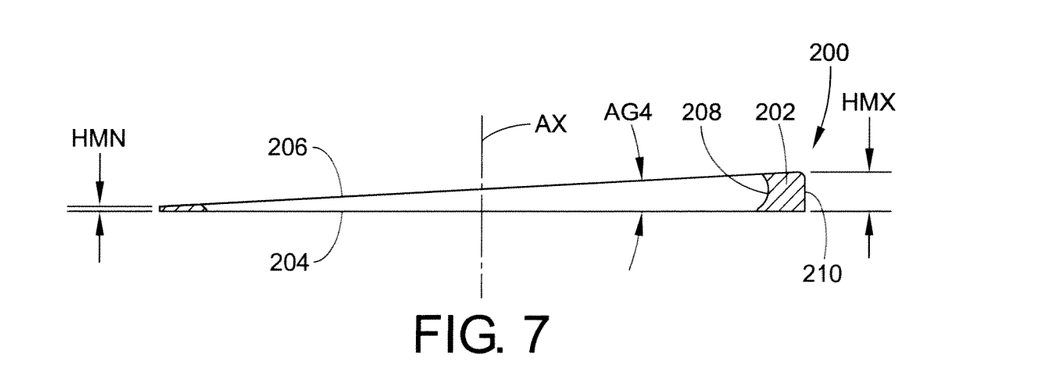
FIG. 7 is a cross-sectional side view of the directional stability ring in FIG. 6 taken along line 7-7 thereof.

Another exemplary embodiment of a directional stabilizer ring 200 is shown in FIGS. 6 and 7 and includes a ring body 202 that circumferentially extends fully around a central axis AX to form a complete ring thereabout. Ring body 202 includes a first or mounting wall or surface 204 and a second or biasing wall or surface 206 that is disposed generally opposite mounting surface 204 and at an included angle AG4 relative thereto. Though it will be appreciated that any suitable angle or range of angles can be used, one exemplary range for angle AG4 is from about 3 degrees to about 85 degrees. As shown in the exemplary embodiment in FIG. 7, angle AG1 is approximately 5 degrees. Additionally, ring body 202 also includes an inner wall or surface 208 and an outer wall or surface 210 that is spaced radially outwardly therefrom such that mounting surface 204 and biasing surface 206 extend radially therebetween.

In the exemplary embodiment shown in FIGS. 6 and 7, the directional stabilizer ring includes a maximum height, as indicated by dimension HMX, at a first circumferential position on the ring body as is generally indicated by reference number 212. The directional stabilizer ring also has minimum height, as indicated by dimension HMN, at a second circumferential position along ring body 202, as indicated at reference number 214. In the exemplary embodiment shown, the first and second circumferential positions are disposed approximately diametrically opposite one another. However, it will be appreciated that any other arrangement or configuration could alternately be uses.

Additionally, the directional stabilizer ring includes a plane of symmetry PSM extending therethrough, such that at least the functional walls or surfaces (e.g., portions of biasing surface 206) of the directional stabilizer ring have approximately the same positions and configurations and are, thus, approximately mirror images of one another along opposing sides A and B of the plane of symmetry. The directional stabilizer ring also includes at least one plane of non-symmetry extending centrally therethrough and on opposite sides of which at least the functional walls or surfaces (e.g., portions of biasing surface 206) of the directional stabilizer ring have significantly different placements and/or configurations. In the embodiment shown in FIGS. 6 and 7, exemplary planes of non-symmetry are shown as planes NS1 and NS2.

As discussed herein, various walls or surfaces (e.g., biasing surfaces 146 and 206) are shown and described as extending in certain directions and at certain angles (e.g., angles AG1 and AG4). It is to be understood, however, that any such surfaces can be planar or can have any other profile that may be suitable for engaging the flexible wall of a fluid spring assembly. For example, biasing surfaces 146 could be substantially planar or could have a curvilinear profile in a direction approximately radially outwardly from the central axis or in a direction extending approximately annularly along the ring body. In such case, an angle of the surface could be approximated from the shape or profile of the wall or surface.

As used herein with reference to certain elements, components and/or structures (e.g., "first end member" and "second end member"), numerical ordinals merely denote different singles of a plurality and do not imply any order or sequence unless specifically defined by the claim language. Additionally, the term "fluid" is used herein to broadly refer to any liquid or gaseous or vaporous fluid. Most commonly, air is used as the working medium of suspension systems and the components thereof, such as those described herein. However, in other applications, liquids can be used as the working medium. As such, it will be understood that any suitable fluid could be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

What is claimed is:

1. A convoluted-type fluid spring assembly comprising:
   a first end member including an outer surface and having a thin-walled cross section with an approximately planar central portion and an outer peripheral portion;
   a second end member spaced from said first end member, said second end member including an outer surface and having a thin-walled cross section with an approximately planar central portion and an outer peripheral portion;
   a flexible wall including opposing open ends, said flexible wall secured between said outer peripheral portions of said first and second end members and at least partially defining a spring chamber therebetween with a central axis that extends between said opposing open ends, said flexible wall including at least one convoluted wall portion disposed between said opposing open ends;
   a first directional stabilizer ring supported circumferentially around at least a portion of said first end member for biasing at least a first portion said flexible wall in a predetermined direction approximately transverse to said central axis, said first ring including a first wall and a second wall, said first wall disposed axially outwardly from said flexible wall and in approximate alignment with said outer surface of said first end member, said second wall disposed toward said flexible wall and extending at an included angle of from about 5 degrees to about 85 degrees relative to said first wall, said second wall capable of biasing at least said first portion of said flexible wall in said predetermined direction approximately transverse to said central axis.

2. A fluid spring assembly according to claim 1 further comprising a second directional stabilizer ring that is supported circumferentially around at least a portion of said second end member for biasing at least a second portion of said flexible wall in said predetermined direction, said second ring including a first wall and a second wall, said first wall disposed axially outwardly from said flexible wall and in approximate alignment with said outer surface of said second end member, said second wall disposed toward said flexible wall and extending at an included angle of from about 5 degrees to about 85 degrees relative to said first wall.

3. A fluid spring assembly according to claim 2, wherein said second ring is substantially identical to said first ring.

4. A fluid spring assembly according to claim 2, wherein said first and second rings each includes a plane of symmetry extending centrally therethrough and at least one plane of non-symmetry extending centrally therethrough, and said first and second rings are supported about said first and second end members such at least said planes of symmetry are approximately aligned with one another.

5. A fluid spring assembly according claim 1, wherein said flexible wall includes a girdle hoop, a first convoluted wall portion extending between said girdle hoop and a first one of said opposing open ends, and a second convoluted wall portion extending between said girdle hoop and a second one of said opposing open ends.

6. A fluid spring assembly according to claim 5, wherein said second wall of said first ring biases said girdle hoop in said direction approximately transverse to said axis.

7. A suspension system for supporting an associated sprung mass on an associated unsprung mass of an associated vehicle, said suspension system comprising:
   a fluid spring assembly disposed between the associated sprung and unsprung masses, said fluid spring assembly including a first end member capable of securement on the associated sprung mass, a second end member spaced from said first end member and capable of securement on the associated unsprung mass, and a flexible wall secured between said first and second end members and at least partially defining a spring chamber having an axis therebetween, said flexible wall including a girdle hoop, a first convoluted wall portion extending between said girdle hoop and said first end member, and a second convoluted wall portion extending between said hoop said second end member;
   a first directional stabilizer ring supported adjacent said first end member of said fluid spring assembly and capable of biasing at least a first portion of said flexible wall of said fluid spring assembly in a direction approximately transverse to said axis, said first ring including a first surface facing generally away from said flexible wall and a second surface facing generally toward said flexible wall, said second surface disposed at an included angle of from about 3 degrees to about 85 degrees relative to said first surface such that upon engaging said second surface at least said first portion of said flexible wall is biased in said direction approximately transverse to said axis;
   a pressurized fluid source in communication with said fluid spring assembly;
   a control device operatively connect between said pressurized fluid source and said fluid spring assembly, said control device adapted to selectively permit pressurized fluid flow to and from said fluid spring assembly; and, an electronic control unit connected to aid control device, said electronic control unit capable of actuating said control device to selectively permit pressurized fluid flow to and from said fluid spring assembly.

8. A suspension system according to claim 7 further comprising a second directional stabilizer ring supported adjacent said second end member of said fluid spring assembly and capable of biasing at least a second potion of said flexible wall in said direction approximately transverse to said axis.

9. A suspension system according to claim 8, wherein said first and second rings are substantially identical to one another.

10. A suspension system according to claim 8, wherein said second ring includes a first surface facing generally away from said flexible wall and a second surface facing generally toward said flexible wall, said second surface of said second ring disposed at an included angle of from about 3 degrees to about 85 degrees relative to said first surface of said second ring such that upon engaging said second surface of said second ring at least said second portion of said flexible wall is biased in said direction approximately transverse to said axis.

11. A suspension system according to claim 10, wherein said first and second rings each include an area of maximum height, and said first and second rings are oriented about said axis such that said areas of maximum height are approximately aligned with one another and such that said second surfaces of said first and second rings bias said flexible wall in said direction approximately transverse to said axis.

12. A suspension system according to claim 11, wherein at least one of said first and second rings includes a third surface spaced from and approximately aligned with said first surface of said at least one of said first and second rings such that said area of maximum height is formed between said first and third surfaces thereof.

13. A suspension system according to claim 7, wherein said first and second end members lie in corresponding first and second planes which are disposed in approximate alignment with one another, said first ring capable of disposition in any orientation through 360 degrees about said axis such that said second surface can be disposed in any direction for biasing said flexible wall away from an associated interfering structure.

14. A suspension system according to claim 7, wherein said first and second end members lie in corresponding first and second planes which are disposed relative to one another at an included angle of from about 5 degrees to about 40 degrees, said first ring disposed about said axis such that said second surface biases at least said first portion of said flexible wall toward a closed end of said included angle and away from an opposing open end of said included angle.

15. A method of biasing a flexible wall of a fluid spring assembly in a preferred direction, said method comprising:
 a) providing a fluid spring assembly including:
  a1) a first end member including a first outer surface and having an approximately planar central portion and an outer peripheral portion;
  a2) a second end member spaced from said first end member, said second end member including a second outer surface and having an approximately planar central portion and an outer peripheral portion; and,
  a3) a flexible wall extending between said first and second end members and secured along said outer peripheral portions thereof to at least partially forming a spring chamber having a central axis, said flexible wall including at least one convoluted wall portion disposed between said first and second end members;
 b) providing a first directional stabilizer ring including a first surface, a second surface facing away from said first surface and disposed at an included angle of from about 3 degrees to about 85 degrees relative thereto, and an inner surface complementary to said first end member of said fluid spring assembly;
 c) positioning said first ring about said first end member of said fluid spring assembly such that said first surface is facing away from said flexible wall and in approximate alignment with said first outer surface of said first end member, said inner surface is disposed adjacent said outer peripheral portion of said first end member, and said second surface is facing toward said flexible wall such that said second surface is capable of abuttingly engaging said flexible wall and biasing at least a portion thereof toward said preferred direction; and,
 d) securing said first ring about said first end member such that upon relative displacement of said first and second end members toward one another said first ring engages and biases at least a portion of said flexible wall in approximately said preferred direction.

16. A method according to claim 15 further comprising:
 e) providing a second directional stabilizer ring including a first surface, a second surface facing away from said first surface and disposed at an included angle of from about 3 degrees to about 85 degrees relative thereto, and an inner surface complementary to said second end member of said fluid spring assembly; and,
 f) positioning said second ring about said second end member of said fluid spring assembly such that said first surface is facing away from said flexible wall and in approximate alignment with said first outer surface of said second end member, said inner surface is disposed adjacent said outer peripheral portion of said second end member, and said second surface is facing toward said flexible wall such that said second surface is capable of abuttingly engaging said flexible wall and biasing at least a portion thereof toward said preferred direction; and,
 g) securing said second ring about said second end member such that upon relative displacement of said first and second end members toward one another, said second ring engages and biases at least a portion of said flexible wall in approximately said preferred direction.

17. A method according to claim 16, wherein said first and second rings each include a plane of symmetry extending centrally therethrough and at least one plane of non-symmetry extending centrally therethrough, and wherein f) includes aligning said plane of symmetry of said second ring with said plane of symmetry of said first ring prior to securing said second ring in g).

18. A method according to claim 16, wherein said first and second rings each include an area of maximum height and an area of minimum height, and wherein f) includes aligning said area of maximum height of said second ring with said area of maximum height of said first ring prior to securing said second ring in g).

* * * * *